(12) United States Patent
Shen et al.

(10) Patent No.: US 11,799,946 B2
(45) Date of Patent: Oct. 24, 2023

(54) METHOD AND APPARATUS FOR CLOUD SERVICE MANAGEMENT, AND READABLE STORAGE MEDIUM

(71) Applicant: ZTE Corporation, Shenzhen (CN)

(72) Inventors: Shiyuan Shen, Shenzhen (CN); Jun Yuan, Shenzhen (CN); Meng Wu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/626,853

(22) PCT Filed: Oct. 22, 2020

(86) PCT No.: PCT/CN2020/122796
§ 371 (c)(1),
(2) Date: Jan. 13, 2022

(87) PCT Pub. No.: WO2021/078192
PCT Pub. Date: Apr. 29, 2021

(65) Prior Publication Data
US 2022/0232065 A1    Jul. 21, 2022

(30) Foreign Application Priority Data

Oct. 22, 2019 (CN) .......................... 201911008069.8

(51) Int. Cl.
*H04L 67/10* (2022.01)
*H04L 67/51* (2022.01)
*H04L 12/46* (2006.01)

(52) U.S. Cl.
CPC .......... *H04L 67/10* (2013.01); *H04L 12/4641* (2013.01); *H04L 67/51* (2022.05)

(58) Field of Classification Search
CPC ...... H04L 67/10; H04L 67/51; H04L 12/4641
(Continued)

(56) References Cited

U.S. PATENT DOCUMENTS

2015/0139238 A1   5/2015 Pourzandi et al.
2016/0337179 A1*  11/2016 Rao ..................... H04L 12/4641
(Continued)

FOREIGN PATENT DOCUMENTS

CN    107104871 A    8/2017
CN    107133083 A    9/2017

OTHER PUBLICATIONS

Spadaro, et al. Orchestrated SDN-based VDC Provisioning over Multi-Technology Optical Data Centre Networks, 2017 19th International Conference on Transparent Optical Networks, Jul. 2017, pp. 1-4.

(Continued)

*Primary Examiner* — Frantz B Jean
(74) *Attorney, Agent, or Firm* — Vivacqua Crane, PLLC (57) ABSTRACT

A method and an apparatus for cloud service management, and a readable storage medium are disclosed. The method includes steps of: by a service management module in response to receipt of a work order of an application request, splitting the work order, creating a department and a virtual data center (VDC), creating a user, and binding the user to the department and the VDC, where the work order comprises a resource creation request and a resource parameter; by a resource management module, sending the resource parameter to an underlying resource pool through an interface; by the resource management module, sending a first notification to a software defined network (SDN) controller, where the first notification is a notification requesting to send a flow table; and by the SDN controller, sending the flow table to gateway device according to the first notification.

11 Claims, 3 Drawing Sheets

(58) Field of Classification Search
USPC .......................................................... 709/201
See application file for complete search history.

(56) References Cited

U.S. PATENT DOCUMENTS

2017/0126792 A1    5/2017  Halpern et al.
2022/0327359 A1*  10/2022  Ahuja ................... G06N 3/063

OTHER PUBLICATIONS

Zuo, C. Study of Multi-tenant Data Center Network Based on SDN—Feb. 15, 2017, pp. 1-53.
International Searching Authority. International Search Report and Written Opinion for PCT Application No. PCT/CN2020/122796 and English translation, dated Jan. 19, 2021, pp. 1-10.
European Patent Office. Extended European Search Report for EP Application No. 20879980.9, dated Jun. 2, 2022, pp. 1-9.

* cited by examiner

METHOD AND APPARATUS FOR CLOUD SERVICE MANAGEMENT, AND READABLE STORAGE MEDIUM

CROSS-REFERENCE TO RELATED APPLICATION

This application is a national stage filing under 35 U.S.C. § 371 of international application number PCT/CN2020/122796, filed Oct. 22, 2020, which claims priority to Chinese patent application No. 201911008069.8, filed Oct. 22, 2019. The contents of these applications are incorporated herein by reference in their entirety.

TECHNICAL FIELD

Embodiments of the present disclosure relate to, but not limited to, the field of cloud computing, in particular to but not limited to, a method and an apparatus for cloud service management, and a readable storage medium.

BACKGROUND

With the prosperity of the Internet and the rapid development of ICT services, the informatization development of the whole society will enter a new era of intelligent services, requiring networks to have new capabilities such as flexible connection, intelligent data and natural interaction. However, conventional networks cannot meet these new requirements, operators have to transform and reconstruct the networks. In the general direction of ICT network evolution in the future, various communication manufacturers put forward the Transformation 3.0 Plan, aiming to become a leading intelligent integrated information service operator, and strive to promote the future network reconstruction characterized by network intelligence, business ecology and intelligent operation. LSN is a regional integrated information service node. By upgrading and reconstructing the traditional central office of the operator into a cloud VDC and combining point and area layout of ICT comprehensive service capabilities, localized government and enterprise services and industry solutions can be provided for enterprise users; 4K/8K ultra-high definition video services and new interactive video experiences such as VR/AR can be provided for families and individual users; and the Internet of Everything service based on the Internet of Things can also be provided.

The development of SDN (Software Defined Network)/NFV (Network Function Virtualization) technology makes NFV become a hot spot at present, and provides possibility for the rapid deployment and flexible adjustment of the networks. However, in existing technologies, during configuring virtual resources for users to open relevant cloud services in a cloud management platform, administrators need to perform manual configuration, inconvenient for unified management.

SUMMARY

According to some embodiments of the present disclosure, a method and a device for cloud service management, and a non-transitory computer-readable storage medium are provided.

According to the embodiments of the present disclosure, a method for cloud service management is provided, and may include steps of:

by a service management module, in response to receipt of a work order of an application request, splitting the work order; creating a department and a virtual data center (VDC); creating a user, and binding the user to the department and the VDC; where the work order comprises a resource creation request and a resource parameter;

by a resource management module, sending the resource parameter to an underlying resource pool through an interface;

by the resource management module, sending a first notification to a software defined network (SDN) controller, where the first notification is a notification requesting to send a flow table; and by the SDN controller, sending the flow table to gateway device according to the first notification.

According to the embodiments of the present disclosure, a device for cloud service management is provided, and may include: a cloud management platform, a virtual resource pool module, an SDN controller, and a gateway device. The cloud management platform includes a service management module and a resource management module.

The service management module may be configured to, in response to receipt of a work order of an application request, split the work order, create a department and a VDC, create a user, and bind the user to the department and the VDC, where the work order comprises a resource creation request and a resource parameter.

The resource management module may be configured to send the resource parameter to an underlying resource pool of the virtual resource pool module through an interface; the resource management module is further configured to send a first notification to the SDN controller, where the first notification is a notification requesting to send a flow table.

The virtual resource pool module may be configured to share a resource and provide an interface to the cloud management platform.

The SDN controller may be configured to send the flow table to the gateway device according to the first notification.

According to the embodiments of the present disclosure, a device for cloud service management is provided, and includes a processor, a memory and a communication bus. The communication bus is configured to provide connection and communication between the processor and the memory, and the processor is configured to execute at least one computer program stored in the memory to perform steps of the method for cloud service management described above.

According to the embodiments of the present disclosure, a non-transitory computer-readable storage medium storing at least one computer program is provided, the at least one computer program is executable by at least one processor to cause the at least one processor to perform steps of the method for cloud service management described above.

Other features and corresponding beneficial effects of the present disclosure are set forth in the specification, and it should be understood that at least some of the beneficial effects will become apparent from the description of the present disclosure.

DETAILED DESCRIPTION

To make the objects, technical schemes and advantages of the present disclosure clearer, in the following the present disclosure is described in more detail by specific embodiments with reference to the accompanying drawings. It should be understood that the specific embodiments described herein are merely intended to illustrate the present disclosure and are not intended to limit the present disclosure.

Exemplary Embodiment I

To solve the problem that a manual operation which is not convenient for unified management is required during configuring of virtual resources and opening relevant cloud services for users by a cloud management platform when an application request is received, a method for cloud service management is provided. The method for cloud service management will be described with reference to embodiments below.

Figure 1:
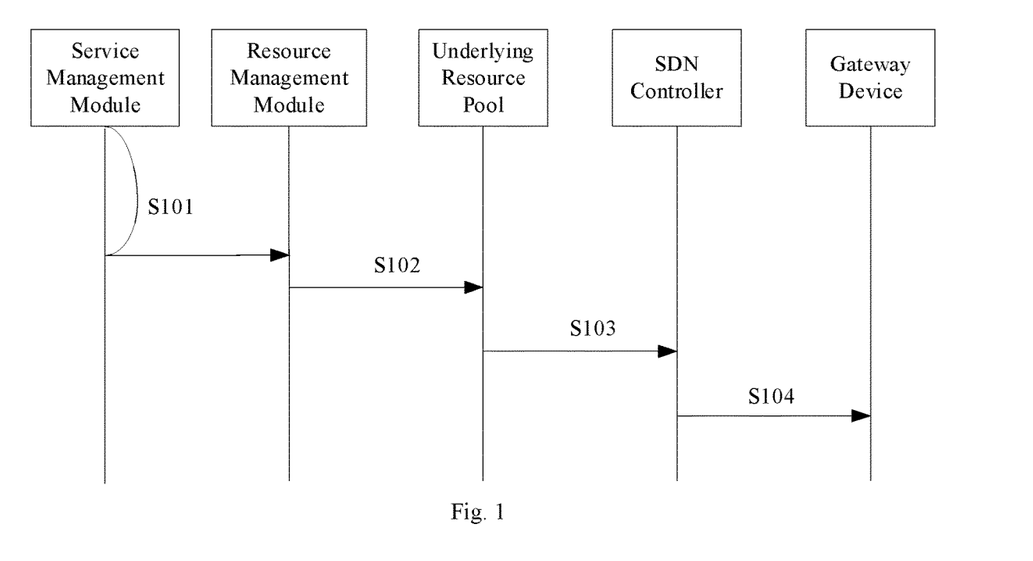
FIG. 1 is a basic flow chart of a method for cloud service management according to embodiment I of the present disclosure.

Referring to FIG. 1, FIG. 1 is a basic flowchart of a method for cloud service management according to an embodiment of the present disclosure. The method for cloud service management includes steps S101-S104.

At S101, when receiving a work order of an application request, a service management module splits the work order, creates a department and a virtual data center (VDC), and creates a user and binds the user to the department and the VDC.

In the embodiment, when receiving the work order of the application request, the service management module automatically creates a total thread which may be called "Work Order Service" thread. The embodiments of the present disclosure are not limited to this thread, a developer can develop a customized thread if needed. Then, the "Work Order Service" thread splits the work order. The work order includes a resource creation request and a resource parameter. The resource creation request includes at least one selected from a group consisting of: network creation request, route creation request, firewall creation request, virtual machine creation request, cloud disk creation request and load balance creation request.

In the embodiment, the work order of the application request received by the service management module is the work order of a first application request, and the work order of the first application request is an internal cloud service request. The internal cloud service request may be an application procedure for an internal employee to submit related resources and products in a conventional operation and maintenance OA system of an operator when he wants to subscribe to a service catalog or purchase resources and products, and this application is the work order of the first application request.

In the embodiment, when receiving the work order of the first application request, the service management module splits the work order, and then verifies the work order to check a presence of a tenant of the VDC of a cloud resource to be created by the work order. If the tenant exists, the "Work Order Service" thread calls an ORG (Organize) thread to create a department and a VDC; and then, the "Work Order Service" thread calls an ACL (Access Control List) thread to create a user, and binds the user to the department created by the ORG thread, and binds the user to the VDC created by the ORG thread. If the VDC tenant does not exist, a cloud environment with the number of eni networks and private networks meeting the application may be selected according to the quota quantities in a work order requested by a user, and then an address pool is verified. When the verification does not meet the preset application requirements, the "Work Order Service" thread performs a return processing and informs the user. When the verification meets the preset application requirements, the verification is successful, and the "Work Order Service" thread calls the ORG thread to create a department and a VDC; and then, the "Work Order Service" thread calls the ACL thread to create a user, binds the user to the department created by the ORG thread, and binds the user to the VDC created by the ORG thread.

In the embodiment, the work order further includes an access token, and before the ORG thread creates the department and the VDC, the service management module also checks a permission of a user according to the access token. In the embodiment, the "Work Order Service" thread of the service management module calls an IAM (Identity and Access Management) thread to check the permission of the user according to the access token. The permission of the user includes the resource permission that the user can call and the basic permission that the user can access. After checking the permission of the user, the permission of the user is obtained and returned to the "Work Order Service" thread.

In the embodiment, moreover, the work order of the application request received by the service management module may be a work order of a first application request and/or a work order of a second application request, and the work order of the second application request is an external cloud service request. The external cloud service may be a financial cloud service, an enterprise cloud service, etc. The external cloud service request may be an application process for an enterprise user to submit related resources and products in the IBP system of the traditional operation and maintenance system of the operator when he wants to open the external network cloud link function, and this application is the work order of the second application request. In addition to a resource request and a resource parameter, the work order also includes configuration information of a port, such as uplink port of ONU, uplink and downlink ports of OLT device, uplink and downlink ports of convergence switch, LSNID, LAN access type, OLT device name, OLT port number, VLAN and other information. In the embodiment, when receiving the work order of the second application request, the service management module splits the work order, creates a department and a VDC, and creates a user. Before binding the user to the department and the VDC, the service management module further sends splitting information for the second application request to a network operation resource center of an operator, and sends configuration information in the second application request to the resource management module. The resource management module performs a port configuration for an access side of the external cloud service according to the port configuration information, and configures a rule for converting qinq to vlan or for converting qinq to vxlan in a front-end switch.

In the embodiment, a DCI (Data Center Interconnection) thread in the resource management module automatically performs a port configuration for an access layer of the cloud service according to the configuration information of the uplink port of ONU, the uplink and the downlink port of OLT device, the uplink and the downlink port of convergence switch, and automatically configures a rule for converting qinq to vlan or for converting qinq to vxlan according to LSNID, LAN access type, OLT device name, OLT port number, VLAN and other information. The resource management module further calls an API interface of the SDN controller to configure an external network mapping relation between VIN and VLAN.

At S102, the resource management module sends the resource parameter to an underlying resource pool through an interface.

In the embodiment, the "Work Order Service" thread of the service management module calls an OPERATE thread of the resource management module for the resource creation request and the resource parameter of the work order. When the resource creation request is a virtual machine creation request, the virtual machine resource request is sent to a virtual resource management (VRM) thread of the resource management module. The VRM thread sends the resource parameter for creating a virtual machine to the underlying resource pool through the API interface, calls a resource, deploys a virtual machine resource function, and so on. The resource parameter for creating a virtual machine includes, but is not limited to, a virtual machine image and a virtual machine specification.

When the resource creation request is at least one of network creation request, route creation request, firewall creation request and load balance creation request, the OPERATE thread sends the resource creation request to the DCI thread to create a network, a route, a firewall and a load balance. The DCI thread sends the resource parameter to the underlying resource pool through the API interface, calls a resource, deploys a resource function, and so on. The resource creation parameters include at least one of the following: network CIDR, VLAN, cloud firewall and cloud load balance policy rules, but not limited to the above resource parameters.

When the resource creation request is a cloud disk creation request, the OPERATE thread sends the resource request to a VOLUME thread to create a cloud disk. The resource parameters for creating the cloud disk include at least one of the following: data disk size, system disk size and cloud disk type. The VOLUME thread sends the resource parameter to the underlying resource pool through the API interface, calls a resource, and deploys a resource function, and so on.

At S103, the resource management module sends a first notification to a software defined network (SDN) controller.

In the embodiment, the first notification is a notification requesting to send a flow table.

At S104, the SDN controller sends the flow table to gateway device according to the first notification.

In the embodiment, the SDN controller sends the flow table to the gateway device according to the notification of sending the flow table sent by the resource management module. The gateway device includes Bleaf gateway device and/or ILeaf gateway device, which realizes the connection and communication according to the requirements of the access layer equipment user and the creation of the cloud resource.

In the embodiment, when receiving the second request by the service management module, sending, by the SDN controller, the flow table to the gateway device according to the first notification further includes: calling, by the resource management module, the API interface of the SDN controller to configure the external network mapping relation between VIN and VLAN, and sending, by the SDN controller, all flow tables of VLAN/VXLAN mapping relation to the gateway device. The resource management module adds network VLAN information created by the DCI thread to the port according to the mapping relation, and adds the port to VNI under VDC created by ORG thread of the service management module. After successful configuration, the "Work Order Service" thread returns a response of successful configuration to IBP system, and the IBP system sends the work order to the customer service center of the data center for external deployment.

According to the method for cloud service management provided by the embodiments of the present disclosure, when receiving a work order of an application request, a service management module splits the work order, creates a department and a VDC, creates a user using an ACL thread, and binds the user to the department and the VDC, where the work order includes a resource creation request and a resource parameter; a resource management module sends the resource request parameter to an underlying resource pool through an API interface, and the underlying resource pool creates a resource according to the resource creation request parameter; and the resource management module sends a notification requesting to send a flow table to a SDN controller, and the SDN controller sends the flow table to gateway device. In this way, an automatic analysis of an application work order of a user is realized and an automatic creation of cloud resources is completed.

Exemplary Embodiment II

According to the management method of the present disclosure, an automatic analysis of the application work order of the user is realized for completing the automatic creation of cloud resources. For ease of understanding, the method for cloud service management of the present disclosure will be described within an application scenario.

Figure 2:
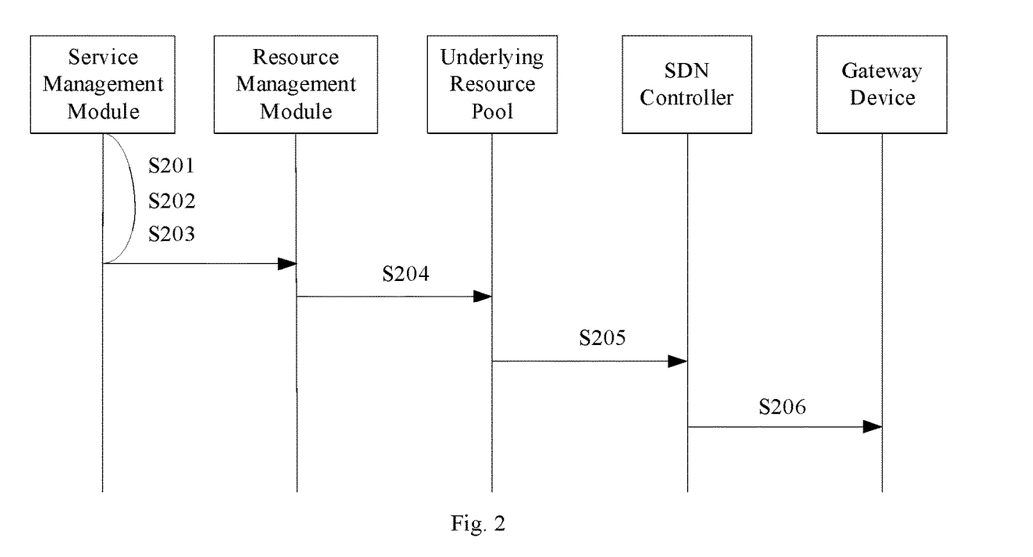
FIG. 2 is a detailed flowchart of the method for cloud service management according to embodiment II of the present disclosure.

FIG. 2 is a detailed flowchart of a method for cloud service management according to embodiment two of the present disclosure, and the method for cloud service management includes steps S201-S207.

At S201, when receiving a work order of an application request, a service management module splits and verifies the work order.

In the embodiment, the work order of the application request is a request that an internal employee wants to apply for a cloud disk. When receiving the work order of the application request, the service management module automatically creates a total thread. The total thread may be called "Work Order Service" thread, but is not limited to this thread, and can be defined by a developer. Then, the "Work Order Service" thread splits the work order. The work order includes a resource request and a resource parameter for creating a cloud disk. The resource parameter for creating a cloud disk includes data disk size, system disk size and cloud disk type.

In the embodiment, when receiving the work order of the first application request, the service management module splits the work order, and then verifies the work order to check an existence of a tenant of the VDC of a cloud resource to be created by the work order. If the tenant exists, S202 is executed. If the tenant does not exist, a cloud environment with the number of eni networks and private networks meeting the application may be selected according to the quota quantities in a work order requested by a user, and an address pool is verified. When the verification does not meet the preset application requirements, the "Work Order Service" thread performs a return processing and informs the user, and then S207 is executed. When the verification meets the preset application requirements, the verification is successful, and S202 is executed.

At S202, the service management module checks a permission of a user according to an access token.

In the embodiment, the work order of the application request also includes an access token. The "Work Order Service" thread of the service management module calls an IAM thread to check the permission of the user according to the access token. The permission of the user includes the resource permission for what resources the user can call and the basic permission for what the user can access. After the specific permission of the user is checked, the permission of the user is obtained and returned to the "Work Order Service" thread.

At S203, a department and a VDC are created, and a user is created and bound to the department and the VDC.

In the embodiment, the "Work Order Service" thread of the service management module calls an ORG thread to create a department and a VDC; and then, the "Work Order Service" thread calls an ACL thread to create a user, binds the user to the department created by the ORG thread, and binds the user to the VDC created by the ORG thread.

At S204, the resource management module sends the resource parameter to an underlying resource pool through an API interface.

In the embodiment, the "Work Order Service" thread of the service management module calls an OPERATE thread of the resource management module for the resource creation request and the resource parameter of the work order, and the OPERATE thread sends a cloud disk resource request to a VOLUME thread to create a cloud disk. The VOLUME thread sends the resource parameter to the underlying resource pool through the API interface, calls a resource and deploys a resource function.

At S205, the resource management module sends, to an SDN controller, a first notification which is a notification requesting to send a flow table.

At S206, the SDN controller sends the flow table to gateway device according to the first notification.

In the embodiment, the SDN controller sends a routing flow table to the gateway device according to the notification of sending the routing flow table sent by the resource management module. The gateway device includes Bleaf gateway device and ILeaf gateway device, which realizes the connection and communication according to the requirements of the access layer equipment user and the creation of the cloud resource.

At S207, the method for cloud service management ends.

According to the method for cloud service management provided by the embodiments of the present disclosure, when receiving a work order of an application request, a service management module splits and verifies the work order; the service management module checks a permission of a user according to an access token, then calls an ORG thread to create a department and a VDC, creates a user using an ACL thread, and binds the user to the department and the VDC, where the work order includes a resource creation request and a resource parameter; a resource management module sends the resource request parameter to an underlying resource pool through an API interface, and the underlying resource pool creates a resource according to the resource creation request parameter; and the resource management module sends a notification requesting to send a flow table to a SDN controller, and the SDN controller sends the flow table to gateway device. In this way, an automatic analysis of an application work order of a user, the automatic creation of cloud resources and the automatic opening of internal cloud services are realized.

Exemplary Embodiment III

According to the management method of the present disclosure, an automatic analysis of an application work order of a user and the automatic creation of cloud resources are realized. For ease of understanding, the method for cloud service management of the present disclosure will be described within an application scenario.

Figure 3:
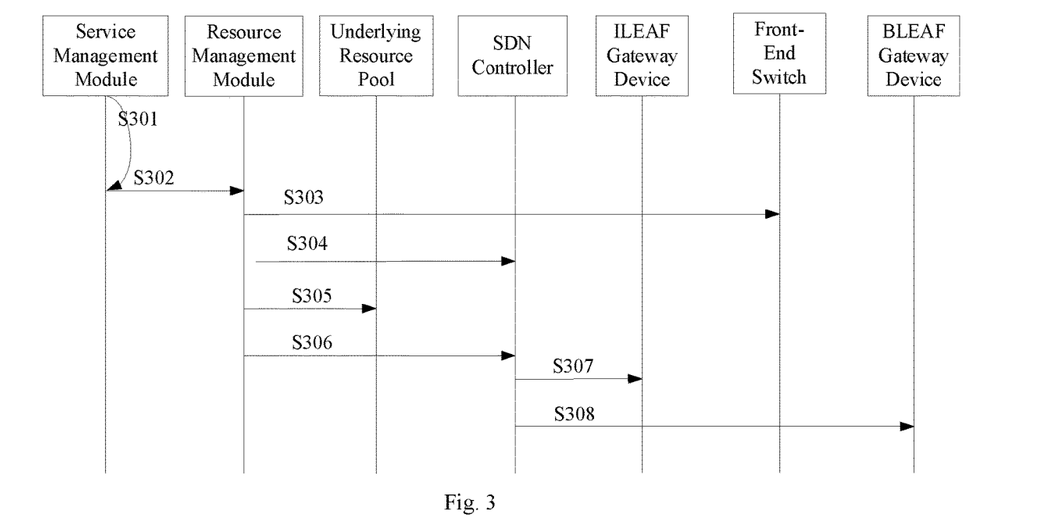
FIG. 3 is a detailed flowchart of a method for cloud service management according to embodiment III of the present disclosure.

FIG. 3 is a detailed flowchart of the method for cloud service management according to embodiment III of the present disclosure. The method for cloud service management includes steps S301-S308.

At S301, when receiving a work order of an application request, a service management module splits the work order.

In the embodiment, the work order of the application request is a request that an external enterprise wants to apply for a cloud service, and the request may be entered into the IBP system of the traditional operation and maintenance system of the operator by an external enterprise user or an operation and maintenance staff of the data center. When receiving the work order of the application request, the service management module automatically creates a total thread. The total thread may be called "Work Order Service" thread, but is not limited to this thread, and can be defined by a developer. Then, the "Work Order Service" thread splits the work order. After splitting the order, ONU, OLT and convergence switch application resources in the work order are sent to a network operation resource center of an operator for processing. The work order includes a cloud disk resource creation request, a resource parameter and port configuration information. The resource creation request includes network creation request, route creation request, firewall creation request, virtual machine creation request, cloud disk creation request and load balance creation request. The port configuration information includes uplink port of ONU, uplink and downlink ports of OLT device, uplink and downlink ports of convergence switch, LSNID, LAN access type, OLT device name, OLT port number, VLAN and other information.

At S302, the configuration information in the work order is sent to the operator and the resource management module, and the resource management module performs a port configuration for an access side of the external cloud service according to the configuration information.

In the embodiment, the device configuration information in the work order is sent to the network operation resource center of the operator, and the equipment to be changed is recorded and verified in the network operation resource center of the operator.

In the embodiment, after the equipment to be changed is verified in the network operation resource center of the operator, a DCI thread in the resource management module may automatically perform a port configuration for the access layer of the cloud service according to the configuration information of uplink port of uplink port of ONU, uplink and downlink ports of OLT device, uplink and downlink ports of convergence switch.

At S303, the resource management module configures a rule for converting qinq to vlan or for converting qinq to vxlan in a front-end switch according to the configuration information.

In the embodiment, the DCI thread in the resource management module automatically configures the rule for converting qinq to vlan for converting qinq to vxlan according to LSNID, LAN access type, OLT device name, OLT port number, VLAN, etc., in the configuration information.

At S304, the resource management module calls an API interface of the SDN controller to configure an external network mapping relation between VIN and VLAN.

In the embodiment, the DCI thread in the resource management module calls the API interface of the SDN controller to configure the external network mapping relation between VIN and VLAN.

At S305, the resource management module sends the resource parameter to an underlying resource pool through the API interface.

In the embodiment, the "Work Order Service" thread of the service management module calls an OPERATE thread of the resource management module for the resource creation request and the resource parameter of the work order. When the resource creation request is a virtual machine creation request, the virtual machine resource request is sent to a virtual resource management (VRM) thread of the resource management module. The VRM thread sends the resource parameter for creating a virtual machine to the underlying resource pool through the API interface, calls a resource, deploys a virtual machine resource function, and so on. The resource parameter for creating a virtual machine includes, but is not limited to, a virtual machine image and a virtual machine specification.

When the resource creation request is at least one of network creation request, route creation request, firewall creation request and load balance creation request, the OPERATE thread sends the resource creation request to the DCI thread to create network, route, firewall and load balance. The DCI thread sends the resource parameter to the underlying resource pool through the API interface, calls a resource, deploys a virtual machine resource function, and so on. The resource creation parameter includes at least one of the following: network CIDR, VLAN, cloud firewall and cloud load balancing policy rules, but not limited to the above resource parameters.

When the resource creation request is a cloud disk creation request, the OPERATE thread sends the resource creation request to a VOLUME thread to create a cloud disk. The resource parameters for creating the cloud disk include at least one of the following: data disk size, system disk size and cloud disk type. The VOLUME thread sends the resource parameter to the underlying resource pool through the API interface, calls a resource, and deploys a resource function.

At S306, the resource management module sends a first notification to the SDN controller.

In the embodiment, the first notification is a notification requesting to send a flow table.

At S307, the SDN controller sends the configured external network mapping relation between VIN and VLAN to ILEAF gateway device according to the first notification.

In the embodiment, the SDN controller sends the flow table of the external network mapping relation between VIN and VLAN to the ILEAF gateway device according to the notification of sending the flow table of the external network mapping relation between VIN and VLAN sent by the resource management module.

At S308, the SDN controller sends the configured external network mapping relation between VIN and VLAN to BLEAF gateway device according to the first notification.

In the embodiment, the SDN controller sends the flow table of the external network mapping relation between VIN and VLAN to the BLEAF gateway device according to the notification of sending the flow table of the external network mapping relation between VIN and VLAN sent by the resource management module.

According to the method for cloud service management provided by the present disclosure, when receiving a work order of an external application request, a service management module splits the work order, and then sends configuration information in the work order to a resource management module; the resource management module performs a port configuration for an access side of the external cloud service according to the configuration information, and configures a rule for converting qinq to vlan or for converting qinq to vxlan in a front-end switch, calls an API interface of a SDN controller to configure an external network mapping relation between VIN and VLAN, and sends the resource parameter to an underlying resource pool through the API interface, calls a resource and deploys a resource; and the resource management module sends a first notification to the SDN controller, and the SDN controller sends a flow table of the configured external network mapping relation between VIN and VLAN to an ILEAF gateway device and a BLEAF gateway device according to the first notification. In this way, configuring resources via a manual operation is avoided, an automatic analysis of an application work order of a user is realized, an automatic creation of cloud resources is completed. Configuring information to a front-end switch of OLT via a manual operation is avoided, an automatic transmission of a configuration to a front-end switch of OLT and automatically configuring a rule for converting qinq to vlan (vxlan) in the front-end switch are achieved, and the automatic opening of an external cloud service is achieved.

Exemplary Embodiment IV

To solve the problem that the manual operation which is inconvenient for unified management may be required during configuring virtual resources and opening relevant cloud services for users by the cloud management platform when receiving an application request, a device for cloud service management is provided. The device for cloud service management provided by the present disclosure will be described with reference to embodiments below.

Figure 4:
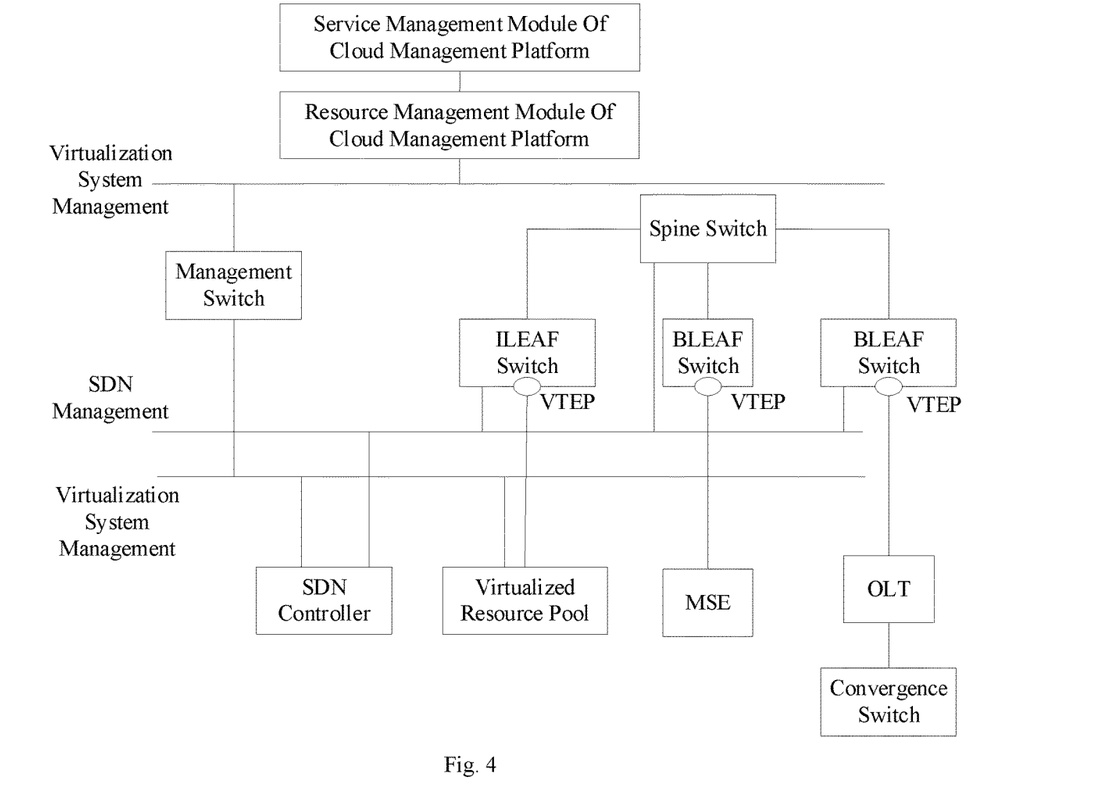
FIG. 4 is a composition diagram of a device for cloud service management according to embodiment IV of the present disclosure.

Referring to FIG. 4, FIG. 4 is a composition diagram of a device for cloud service management according to embodiment IV of the present disclosure. The device for cloud service management includes a cloud management platform, a virtual resource pool module, an SDN controller, and gateway device, where the cloud management platform includes a service management module and a resource management module.

The service management module is configured to, when receiving a work order of an application request, split the work order; create a department and a VDC; and create a user, and bind the user to the department and VDC, where the work order includes a resource creation request and a resource parameter.

The resource management module is configured to send the resource parameter to an underlying resource pool of the virtual resource pool module through an interface. The resource management module is further configured to send, to the SDN controller, a first notification which is a notification requesting to send a flow table.

The virtual resource pool module is configured to share a resource and provide an interface to the cloud management platform.

The SDN controller is configured to send the flow table to the gateway device according to the first notification.

In the embodiment, when receiving a work order of an application request for an internal cloud service, the service management module of the cloud management platform splits and verifies the work order. When receiving the work order of the application request for the internal cloud service, the service management module of the cloud management platform automatically creates a total thread. The total thread may be called "Work Order Service" thread, but is not limited to this thread, and can be a customized thread defined by a developer. Then, the "Work Order Service" thread splits the work order. The work order includes a resource creation request and a resource parameter. The resource creation request includes at least one of the following: network creation request, route creation request, firewall creation request, virtual machine creation request, cloud disk creation request and load balance creation request.

To split and verify the work order is to check a presence of a tenant of the VDC of a cloud resource to be created by the work order. If the tenant exists, the "Work Order Service" thread calls an ORG (Organize) thread to create a department and a VDC; and then, the "Work Order Service" thread calls an ACL (Access Control List) thread to create a user, and binds the user to the department created by the ORG thread, and binds the user to the VDC created by the ORG thread. If the tenant does not exist, a cloud environment with the number of eni networks and private networks meeting the application may be selected according to the quota quantities in a work order requested by a user, and then an address pool is verified. When the verification does not meet the preset application requirements, the "Work Order Service" thread performs a return processing and informs the user. When the verification meets the preset application requirements, the verification is successful, and the "Work Order Service" thread calls the ORG thread to create a department and a VDC; and then, the "Work Order Service" thread calls the ACL thread to create a user, binds the user to the department created by the ORG thread, and binds the user to the VDC created by the ORG thread.

In the embodiment, when receiving a work order of a first application request, the service management module of the cloud management platform splits and verifies the word order, and then checks a permission of a user according to an access token in the work order. The permission of the user includes the resource permission that the user can call and the basic permission that the user can access. After the permission of the user is checked, the permission of the user is obtained and returned to the "Work Order Service" thread. The work order of the first application request in this embodiment is an internal cloud service request.

In the embodiment, when receiving a work order of a second application request, the service management module splits the word order, creates a department and a VDC, and creates a user. Before binding the user to the department and the VDC, the service management module sends the configuration information in the second application request to an operator and the resource management module. The second application request is an external cloud service request, and the work order of the second application request includes configuration information of a port.

In the embodiment, the resource management module is further configured to perform a port configuration for an access side of the external cloud service according to the configuration information of the port, and configure a rule for converting qinq to vlan or for converting qinq to vxlan in a front-end switch. An API interface of the SDN controller is called to configure an external network mapping relation between VIN and VLAN. The port configuration for the access side includes configuration for the interfaced LSN (Local Service Node) stacked BLEAF switch and port group, and the name and port group of the front-end switch of the interfaced OLT. An interface of the SDN controller triggers a Spine-leaf border convergence switch in LSN, to configure the VLAN/VXLAN mapping relation of a BLEAF switch port, and interface with the multi service edge (MSE) router of LSN through VLAN encapsulation. MSE completes the mutual mapping between VLAN and VxLAN in LSN, and MSE is a direct access to MAN.

In the embodiment, the SDN controller is further configured to send a flow table of the configured external network mapping relation between VIN and VLAN to the gateway device according to the first notification.

The resource management module is further configured to add the created network VLAN information to the port according to the mapping relation, and add the port to the VNI in the VDC.

In the embodiment, the device for cloud service management is further configured for the management of the virtualization system, the management of the SDN module, and the unified management of the whole process.

In the embodiment, the virtual resource pool module integrates physical servers to form one or more logical virtual resource pools, sharing resources including but not limited to computing, storage and network, and providing an external interface to connect with the cloud management platform.

In the embodiment, the gateway device may include BLEAF gateway device and/or ILEAF gateway device. The gateway device supports the OpenFlow protocol. The gateway device is mainly a layer 3 switch working at the network layer, has a routing function, and provides a northbound interface to communicate with the SDN controller.

According to the device for cloud service management provided by the embodiments of the present disclosure, when receiving a work order of an application request for an internal cloud service and/or an external cloud service, a service management module splits and verifies the work order for the internal cloud service, checks a permission of a user, creates a department and a VDC, creates a user, and binds the user to the department and the VDC. A resource management module sends the resource parameter to the resource pool of the virtual resource pool module through an API interface, and the resource management module also sends a first notification to the SDN controller, where the first notification is a notification requesting to send a flow table. The resource pool of the virtual resource module provides an interface to the cloud management platform, which enables the cloud management platform to uniformly arrange, manage and monitor the resource of the resource pool. The SDN controller sends a flow table to gateway device according to the first notification. The work order for the external cloud service is split, and the configuration information in the work order is sent to the resource management module. The resource management module performs a port configuration for an access side of the external cloud service according to the configuration information, and configures a rule for converting qinq to vlan or for converting qinq to vxlan in a front-end switch, calls an API interface of the SDN controller to configure an external network mapping relation between VIN and VLAN, and then sends the resource parameter to an underlying resource pool through the API interface, calls a resource and deploys a resource function. The resource management module sends the first notification to the SDN controller, and the SDN controller may send a flow table of the configured external network mapping relation between VIN and VLAN to the gateway device according to the first notification. According to the device for cloud service management, a manual operation and configuration which is inconvenient for unified management is avoided during configuring virtual resources for users by the cloud management platform. A manual transmission of a configuration to a front-end switch of OLT is avoided, and an automatic configuration for the interfaced LSN stacked BLEAF switch and port group and the equipment name and port group of a front-end switch of OLT are achieved. An automatic configuration of a rule for converting qinq to vlan (vxlan) is completed. An automatic opening of users' internal cloud services and external cloud services is achieved, to achieve integrated internal and external hybrid cloud services and reduce maintenance costs.

Exemplary Embodiment V

Figure 5:
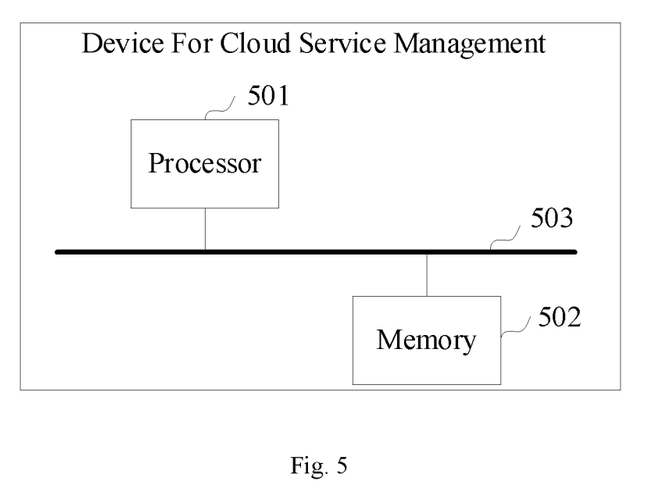
FIG. 5 is a schematic structural diagram of a device for cloud service management according to embodiment V of the present disclosure.

According to the embodiment, a device for cloud service management is also provided, as shown in FIG. 5, including a processor 501, a memory 502 and a communication bus 503.

The communication bus 503 is configured to provide connection and communication between the processor 501 and the memory 502.

The processor 501 is configured to execute at least one computer program stored in the memory 502 to implement at least one step of the method for cloud service management of one of the embodiments I, II and III.

According to the embodiments of the present disclosure, when receiving a work order of an application request, a service management module splits the work order, creates a department and a VDC, creates a user using an ACL thread, and binds the user to the department and the VDC, where the work order includes a resource creation request and a resource parameter; a resource management module sends the resource request parameter to an underlying resource pool through an API interface, and the underlying resource pool creates a resource according to the resource creation request parameter; and the resource management module sends a notification requesting to send a flow table to a SDN controller, and the SDN controller sends the flow table to gateway device. In this way, an automatic analysis of a work order requested by a user is realized and an automatic creation of cloud resources is completed.

Exemplary Embodiment VI

According to the embodiment, a non-transitory computer-readable storage medium is also provided. The non-transitory computer-readable storage medium includes a volatile or nonvolatile, removable or non-removable medium implemented in any method or technology for storing information, such as computer readable instructions, data structures, computer program modules or other data. The computer readable storage medium includes but is not limited to RAM (Random Access Memory), ROM (Read-Only Memory), EEPROM (electrically erasable programmable read only memory, Electrically erasable programmable read-only memory), flash memory or other memory technologies, compact disc read-only memory (CD-ROM), digital versatile disc (DVD) or other optical disc storage, magnetic boxes, magnetic tapes, magnetic disk storage or other magnetic storage devices, or any other medium that can be used to store desired information and can be accessed by a computer.

The non-transitory computer-readable storage medium of the embodiment can be configured to store at least one computer program which, when executed by a processor, causes the processor to implement at least one step of the method for cloud service management of one of the above embodiments I, II and III.

According to the embodiments of the present disclosure, when receiving a work order of an application request, a service management module splits the work order, creates a department and a VDC, creates a user using an ACL thread, and binds the user to the department and the VDC, where the work order includes a resource creation request and a resource parameter; a resource management module sends the resource request parameter to an underlying resource pool through an API interface, and the underlying resource pool creates a resource according to the resource creation request parameter; and the resource management module sends a notification requesting to send a flow table to a SDN controller, and the SDN controller sends the flow table to gateway device. In this way, an automatic analysis of a work order requested by a user is realized and an automatic creation of cloud resources is completed.

The embodiments of the present disclosure have the following beneficial effects.

According to the method and device for cloud service management, and the non-transitory computer-readable storage medium provided by the embodiments of the present disclosure, when receiving a work order of an application request, the service management module splits the work order, creates a department and a VDC, creates a user using an ACL thread, and binds the user to the department and the VDC. The work order includes a resource creation request and a resource parameter. The resource management module sends the resource request parameter to an underlying resource pool through an interface, and the underlying resource pool creates a resource according to the resource creation request parameter. The resource management module sends a notification requesting to send a flow table to an SDN controller, and the SDN controller sends the flow table to gateway device. In this way, the problem that during configuring virtual resources for users and opening relevant cloud services by a cloud management platform, administrators may need to manually operate the configuration, which is not convenient for unified management, is avoided, and the technical effects in some implementation processes, including but not limited to an automatic analysis of a work order requested by a user and an automatic creation of cloud resources are realized.

It will be appreciated by those having ordinary skills in the art that all or some of the steps, systems, functional modules/units of the methods disclosed above may be implemented as software (which may be implemented with computer program code executable by a computing device), firmware, hardware, and appropriate combinations thereof. In a hardware implementation, partitioning between functional modules/units mentioned in the above description does not necessarily correspond to partitioning of physical components. For example, a physical component may have multiple functions, or a function or step may be performed by several physical components in cooperation. Some or all of those physical components may be implemented as software executable by a processor, such as a central processor, digital signal processor or microprocessor, or as hardware, or as an integrated circuit, such as an application-specific integrated circuit.

Furthermore, as well known to those having ordinary skills in the art, a communication medium typically contains computer-readable instructions, data structures, computer program modules, or other data carried by a modulated data signal such as a carrier wave or other transmission mechanism, and may include any information delivery medium. Therefore, the present disclosure is not limited to any particular combination of hardware and software.

The above is a further detailed description of the embodiments of the present disclosure, and should not be considered as limitations to the present disclosure. For those having ordinary skills in the art to which the present disclosure belongs, a number of simple deductions or substitutions may be made without departing from the concept of the present disclosure, the deductions or substitutions shall be regarded as falling within the protection scope of the present disclosure.

What is claimed are:

1. A method for cloud service management, comprising steps of:
   by a service management module, in response to receipt of a work order of an application request, splitting the work order, creating a department and a virtual data center (VDC) by an ORG (Organize) thread, creating a user by an ACL (Access Control List) thread, and binding the user to the department created by the ORG thread and the VDC created by the ORG thread, wherein the work order comprises a resource creation request and a resource parameter;
   by a resource management module, sending the resource parameter to an underlying resource pool through an interface;
   by the resource management module, sending a first notification to a software defined network (SDN) controller, wherein the first notification is a notification requesting to send a flow table; and
   by the SDN controller, sending the flow table to gateway device according to the first notification;
   wherein, the step of by a service management module in response to receiving a work order of an application request, splitting the work order, comprises a step of: in response to receipt of a work order of a first application, splitting and verifying, by the service management module, the work order, and wherein the first request is an internal cloud service request.

2. The method for cloud service management of claim 1, wherein the step of splitting and verifying the work order comprises a step of: after splitting the work order, verifying a presence of a tenant of the VDC of a cloud resource to be created by the work order, and creating the department and the VDC by the ORG thread in response to the presence of the tenant.

3. The method for cloud service management of claim 2, wherein the work order further comprises an access token, and before creating the department and the VDC, the method further comprises a step of:
   by the service management module, checking a permission of a user according to the access token, wherein the permission of the user comprises a resource permission that the user can call and a basic permission that the user can access.

4. The method for cloud service management of claim 1, wherein, the step of by a service management module in response to receipt of a work order of an application request, splitting the work order further comprises steps of:
   by the service management module in response to receipt a work order of a second application request, splitting the work order, wherein the second request is an external cloud service request, and the work order for the second request further comprises configuration information of a port;
   sending the configuration information in the second application request to an operator and the resource management module; and
   by the resource management module, performing a port configuration for an access side of the external cloud service according to the configuration information.

5. The method for cloud service management of claim 4, further comprising: by the resource management module, configuring a rule of converting qinq to vlan or vxlan for a front-end switch according to the configuration information, and by the resource management module, calling an API interface of the SDN controller to configure an external network mapping relation between VIN and VLAN.

6. The method for cloud service management of claim 5, wherein, the step of by the SDN controller, sending the flow table to the gateway device according to the first notification further comprises steps of:
   by the SDN controller, sending a flow table of the configured external network mapping relation between VIN and VLAN to the gateway device according to the first notification; and
   by the resource management module, adding network VLAN information created by a DCI thread to the port according to the mapping relation, and adding the port to a VNI in the VDC.

7. A device for cloud service management, comprising a processor, a memory and a communication bus, wherein:
   the communication bus is configured to provide connection and communication between the processor and the memory; and
   the processor is configured to execute at least one computer program stored in the memory to perform a method for cloud service management, the method for cloud service management comprising steps of:
   by a service management module in response to receipt of a work order of an application request, splitting the work order, creating a department and a virtual data center (VDC) by an ORG (Organize) thread, creating a user by an ACL (Access Control List) thread, and binding the user to the department created by the ORG thread and the VDC created by the ORG thread, wherein the work order comprises a resource creation request and a resource parameter;
   by a resource management module, sending the resource parameter to an underlying resource pool through an interface;
   by the resource management module, sending a first notification to a software defined network (SDN) controller, wherein the first notification is a notification requesting to send a flow table; and
   by the SDN controller, sending the flow table to gateway device according to the first notification;

wherein, the step of by a service management module in response to receiving a work order of an application request, splitting the work order, comprises a step of: in response to receipt of a work order of a first application, splitting and verifying, by the service management module, the work order, and wherein the first request is an internal cloud service request.

8. A non-transitory computer-readable storage medium storing at least one computer program, wherein the at least one computer program is executable by at least one processor to cause the at least one processor to perform a method for cloud service management, the method for cloud service management comprising steps of:

by a service management module in response to receipt of a work order of an application request, splitting the work order, creating a department and a virtual data center (VDC) by an ORG (Organize) thread, creating a user by an ACL (Access Control List) thread, and binding the user to the department created by the ORG thread and the VDC created by the ORG thread, wherein the work order comprises a resource creation request and a resource parameter;

by a resource management module, sending the resource parameter to an underlying resource pool through an interface;

by the resource management module, sending a first notification to a software defined network (SDN) controller, wherein the first notification is a notification requesting to send a flow table; and by the SDN controller, sending the flow table to gateway device according to the first notification;

wherein, the step of by a service management module in response to receiving a work order of an application request, splitting the work order, comprises a step of: in response to receipt of a work order of a first application, splitting and verifying, by the service management module, the work order, and wherein the first request is an internal cloud service request.

9. The method for cloud service management of claim 1, wherein, the step of by a service management module in response to receipt of a work order of an application request, splitting the work order further comprises steps of:

by the service management module in response to receipt a work order of a second application request, splitting the work order, wherein the second request is an external cloud service request, and the work order for the second request further comprises configuration information of a port;

sending the configuration information in the second application request to an operator and the resource management module; and by the resource management module, performing a port configuration for an access side of the external cloud service according to the configuration information.

10. The method for cloud service management of claim 2, wherein, the step of by a service management module in response to receipt of a work order of an application request, splitting the work order further comprises steps of:

by the service management module in response to receipt a work order of a second application request, splitting the work order, wherein the second request is an external cloud service request, and the work order for the second request further comprises configuration information of a port;

sending the configuration information in the second application request to an operator and the resource management module; and by the resource management module, performing a port configuration for an access side of the external cloud service according to the configuration information.

11. The method for cloud service management of claim 3, wherein, the step of by a service management module in response to receipt of a work order of an application request, splitting the work order further comprises steps of:

by the service management module in response to receipt a work order of a second application request, splitting the work order, wherein the second request is an external cloud service request, and the work order for the second request further comprises configuration information of a port;

sending the configuration information in the second application request to an operator and the resource management module; and by the resource management module, performing a port configuration for an access side of the external cloud service according to the configuration information.

\* \* \* \* \*